(12) United States Patent
Shakthidhar B G et al.

(10) Patent No.: US 12,470,937 B2
(45) Date of Patent: Nov. 11, 2025

(54) PROXIMITY-BASED VALIDATION TECHNIQUES

(71) Applicant: Visa International Service Association, San Francisco, CA (US)

(72) Inventors: Nithin Shakthidhar B G, Bangalore (IN); Shashanka Arnady, Bangalore (IN); Sreeharsha Rangarajan, Bangalore (IN)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 306 days.

(21) Appl. No.: 18/351,148

(22) Filed: Jul. 12, 2023

(65) Prior Publication Data

US 2025/0024266 A1    Jan. 16, 2025

(51) Int. Cl.
*H04W 12/63*    (2021.01)
*H04L 9/40*    (2022.01)
(Continued)

(52) U.S. Cl.
CPC .............. *H04W 12/63* (2021.01); *H04L 63/08* (2013.01); *H04W 12/02* (2013.01); *H04W 12/06* (2013.01);
(Continued)

(58) Field of Classification Search
CPC ..... H04W 12/02; H04W 12/06; H04W 12/08; H04W 12/63; H04W 4/023; H04W 4/80; H04L 63/08
See application file for complete search history.

(56) References Cited

U.S. PATENT DOCUMENTS 10,504,093 B1    12/2019 Lewis et al.
10,902,406 B1    1/2021 Morgan et al.
(Continued)

OTHER PUBLICATIONS

P. Hu, P. H. Pathak, Y. Shen, H. Jin and P. Mohapatra, "PCASA: Proximity Based Continuous and Secure Authentication of Personal Devices," 2017 14th Annual IEEE International Conference on Sensing, Communication, and Networking (SECON), San Diego, CA, USA, 2017, pp. 1-9. (Year: 2017).*
(Continued)

*Primary Examiner* — Robert B Leung
(74) *Attorney, Agent, or Firm* — Kilpatrick Townsend & Stockton LLP

(57) ABSTRACT

A server computer receives from a resource provider device transaction data, a first set of wireless communication signals available to the resource provider device, a second set of wireless communication signals available to the resource provider device, and a sound level detected by the resource provider device. The server computer retrieves from a user device a first set of wireless communication signals available to the user device, a second set of wireless communication signals available to the user device, and a sound level detected by the user device. The server computer computes a score based on the first sets of wireless communication signals, the second sets of wireless communication signals, and the detected sound levels. The server computer transmits to an authorization computer the transaction data and the score, thereby causing the transaction to be processed or terminated based on the transaction data and the score.

20 Claims, 5 Drawing Sheets

(51) Int. Cl.
  *H04W 12/02* (2009.01)
  *H04W 12/06* (2021.01)
  *H04W 12/08* (2021.01)
  *H04W 4/02* (2018.01)
  *H04W 4/80* (2018.01)

(52) U.S. Cl.
  CPC ............ *H04W 12/08* (2013.01); *H04W 4/023* (2013.01); *H04W 4/80* (2018.02)

(56) References Cited

U.S. PATENT DOCUMENTS

| | | |
|---|---|---|
| 11,182,802 B1 | 11/2021 | Walters et al. |
| 2014/0059347 A1* | 2/2014 | Dougherty ............ H04W 12/06 713/168 |
| 2014/0129231 A1* | 5/2014 | Herring .................. G10L 25/51 704/270.1 |
| 2016/0291141 A1* | 10/2016 | Han .......................... G01S 5/28 |
| 2016/0365932 A1* | 12/2016 | Carter .................... H04B 11/00 |
| 2017/0353442 A1* | 12/2017 | Burch ................. H04W 12/069 |
| 2019/0325422 A1* | 10/2019 | Chatterjee ............. G06Q 30/06 |
| 2022/0166757 A1* | 5/2022 | Chen .................. G06Q 20/3823 |
| 2022/0222651 A1* | 7/2022 | Dorsey ................. G06Q 20/40 |

OTHER PUBLICATIONS

Choi, W., Seo, M., & Lee, D. H. (2018). Sound-Proximity: 2-Factor Authentication against Relay Attack on Passive Keyless Entry and Start System. Journal of Advanced Transportation, 2018(1), 1935974. (Year: 2018).*

Liu, D., Wang, Q., Zhou, M., Jiang, P., Li, Q., Shen, C., & Wang, C. (2022). SoundID: Securing mobile two-factor authentication via acoustic signals. IEEE Transactions on Dependable and Secure Computing, 20(2), 1687-1701. (Year: 2022).*

Kalamandeen, Andre, et al., "Ensemble: Cooperative Proximity-based Authentication", MobiSys '10: Proceedings of the 8th international conference on Mobile systems, applications, and services, (Jun. 2010), pp. 331-344, https://doi.org/10.1146/1814433.1814466.

Harmouch, Mahmoud, "17 types of similarity and dissimilarity measures used in data science", (Mar. 13, 2021), retrieved from https://towardsdatascience.com/17-types-of-similarity-and-dissimilarity-measures-used-in-data-science-3eb914d2581.

Gohrani, Kunal, Different Types of Distance Metrics used in Machine Learning, (Nov. 10, 2019), retrieved from https://medium.com/@kunal_gohrani/different-types-of-distance-metrics-used-in-machine-learning-e9928c5e26c7.

* cited by examiner

PROXIMITY-BASED VALIDATION TECHNIQUES

CROSS-REFERENCES TO RELATED APPLICATIONS

None.

BACKGROUND

As computing power increases, it is becoming more and more important to provide secure means of performing transactions. Hackers and other fraudsters are increasingly gaining access to account numbers, enabling a high level of identity fraud and theft. One solution to this problem is the use of alternative account representations that are tied to a specific account instead of using real account numbers. However, even these alternative account representations can be subject to theft and misappropriation. Other solutions include verifying credential ownership. For example, a user is requested to additionally submit a personal identification number (PIN) and/or personally identifying information (PII) (e.g., showing an identification card, providing biometrics, etc.). However, such techniques create friction and/or diminish user privacy. Accordingly, there is a need to provide ever increasing security for electronic transactions while maintaining user convenience and efficiency.

Embodiments of the invention address these and other problems individually and collectively.

BRIEF SUMMARY OF THE INVENTION

Techniques for validating a transaction based on device proximity are described. Information such as wireless communication signals (e.g., Bluetooth and Wi-Fi signals detected by each device) as well as sound levels detected by each device are used to compute a score indicative of device proximity, which is used to determine whether to proceed with the transaction.

In some embodiments, a computer-implemented method comprises receiving, by a server computer from a resource provider device, transaction data for a transaction, a first set of wireless communication signals available to the resource provider device, a second set of wireless communication signals available to the resource provider device, and a sound level detected by the resource provider device; retrieving, by the server computer from a user device, a first set of wireless communication signals available to the user device, a second set of wireless communication signals available to the user device, and a sound level detected by the user device; computing, by the server computer, a score based on the first set of wireless communication signals available to the resource provider device, the second set of wireless communication signals available to the resource provider device, the sound level detected by the resource provider device, the first set of wireless communication signals available to the user device, the second set of wireless communication signals available to the user device, and the sound level detected by the user device, wherein the score indicates a proximity of the resource provider device and the user device; and transmitting, by the server computer to an authorization computer, the transaction data and the score, thereby causing the transaction to be processed or terminated based on the transaction data and the score.

In some aspects, computing the score comprises generating a first feature vector, the first feature vector comprising a set of strength values for the first set of wireless communication signals available to the resource provider device and a value representing whether the strength of a first wireless communication signal of the user device is detected by the resource provider device at at least a threshold level; generating a second feature vector, the second feature vector comprising a set of strength values for the first set of wireless communication signals available to the user device and a value representing whether the strength of a first wireless communication signal of the resource provider device is detected by the user device at at least a threshold level; and computing the score based on the first feature vector and the second feature vector.

In some aspects, computing the score comprises generating a first feature vector representing the first set of wireless communication signals available to the resource provider device; generating a second feature vector representing the first set of wireless communication signals available to the user device; generating a third feature vector representing the second set of wireless communication signals available to the resource provider device; generating a fourth feature vector representing the second set of wireless communication signals available to the user device; computing a first value based on the first feature vector and the second feature vector; computing a second value based on the third feature vector and the fourth feature vector; computing a third value based on the sound level detected by the resource provider device and the sound level detected by the user device; and assigning respective weights to the first value, the second value, and the third value.

In some aspects, the method further comprises identifying an environment of the resource provider device; and assigning the respective weights based on the environment.

In some aspects, retrieving, by the server computer from the user device, the first set of wireless communication signals available to the user device, the second set of wireless communication signals available to the user device, and the sound level detected by the user device comprises: transmitting a request to an application on the user device; and responsive to the request, receiving the first set of wireless communication signals available to the user device, the second set of wireless communication signals available to the user device, and the sound level detected by the user device via a network communication from the application on the user device.

In some aspects, the first set of wireless communication signals comprise short-range communication signals and the second set of wireless communication signals comprise Wi-Fi signals. In some aspects, the short-range communication signals comprise Bluetooth signals.

In some aspects, the score is computed based on a Euclidean distance, a Pearson correlation coefficient, a Jaccard similarity coefficient, a Manhattan distance, a Minkowski distance, or a cosine distance.

Embodiments include a server computer comprising: a processor; and a non-transitory computer readable medium operatively coupled to the processor, the non-transitory computer readable medium comprising code executable by the processor for performing any of the methods described above.

Embodiments include a computer-implemented method comprising transmitting, by a resource provider device to a server computer, transaction data for a transaction, a first set of wireless communication signals available to the resource provider device, a second set of wireless communication signals available to the resource provider device, and a sound level detected by the resource provider device, thereby causing the server computer to: compute a value based on the first set of wireless communication signals available to the resource provider device, the second set of wireless communication signals available to the resource provider device, the sound level detected by the resource provider device, a first set of wireless communication signals available to a user device, a second set of wireless communication signals available to the user device, and a sound level detected by the user device, wherein the value indicates a proximity of the resource provider device and the user device, and transmit, to an authorization computer, the transaction data and the value, thereby causing the transaction to be processed or terminated based on the transaction data and the value; and receiving, by the resource provider device, a response message indicating whether the transaction is approved or declined.

In some aspects, the resource provider device receives the transaction data via near-field communication. In some aspects, the server computer further retrieves, from the user device, the first set of wireless communication signals available to the user device, the second set of wireless communication signals available to the user device, and the sound level detected by the user device.

DETAILED DESCRIPTION

Figure 1:
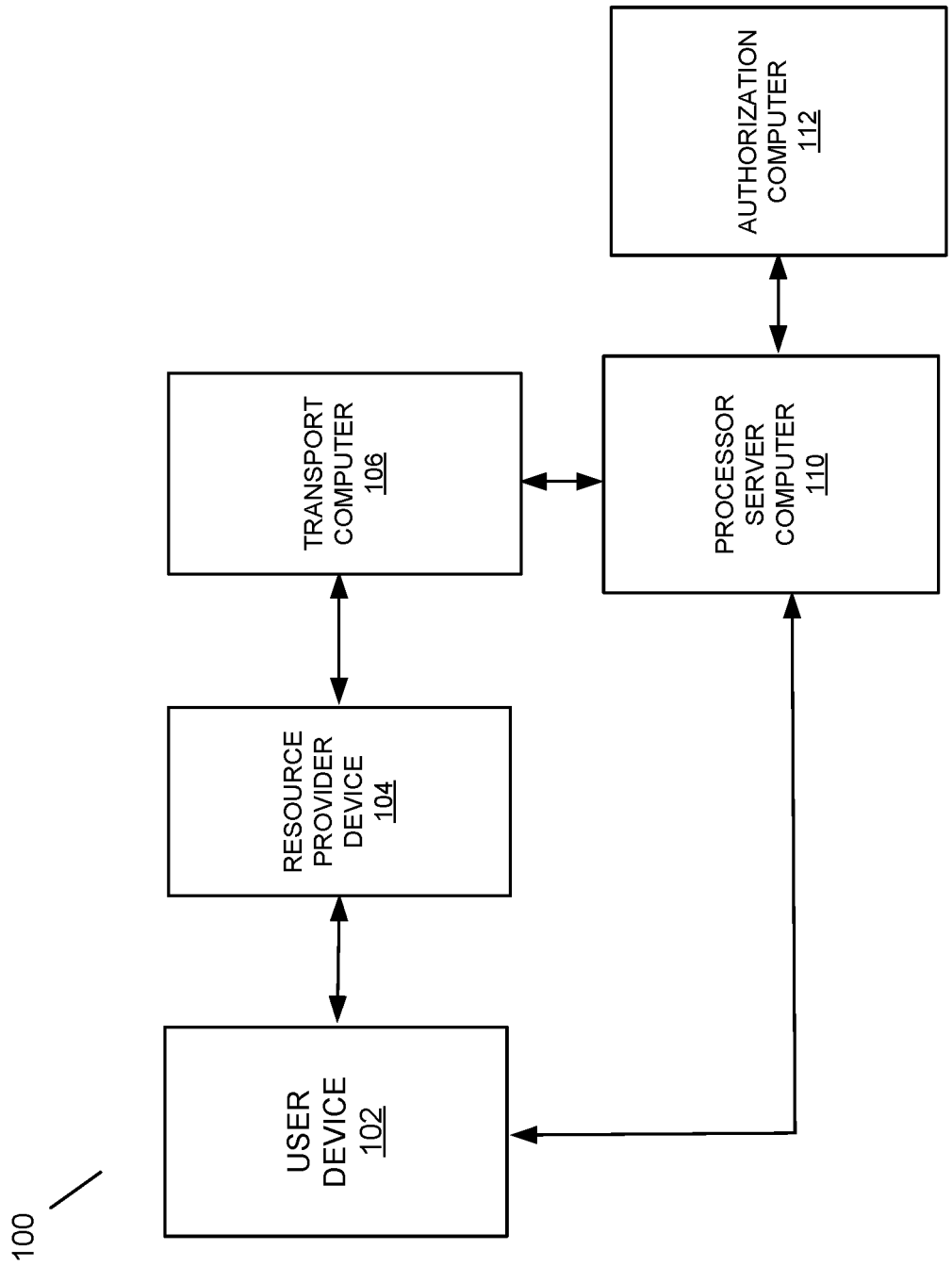
FIG. 1 illustrates a system for validating transactions based on device proximity, according to some embodiments.

Various embodiments of the present invention provide techniques for validating a transaction based on device proximity. In particular, a transaction is processed or terminated based on a proximity between two devices. The device proximity is determined based on a first set of available wireless communication signals (e.g., short-range communication signals such as Bluetooth), a second set of available wireless communication signals (e.g., Wi-Fi signals), and surrounding sound levels, as detected by a pair of devices. For example, one device is a user device such as a smartphone, and the other device is a resource provider device such as an in-store point-of-sale device. The resource provider device and the user device each collect such signals and provide them to a server computer. The server computer receives transaction data for a transaction, a first set of wireless communication signals available to the resource provider device, a second set of wireless communication signals available to the resource provider device, and a sound level detected by the resource provider device from the resource provider device. The server computer retrieves a first set of wireless communication signals available to the user device, a second set of wireless communication signals available to the user device, and a sound level detected by the user device from the user device. The server computer computes a score based on the first set of wireless communication signals available to the resource provider device, the second set of wireless communication signals available to the resource provider device, the sound level detected by the resource provider device, the first set of wireless communication signals available to the user device, the second set of wireless communication signals available to the user device, and the sound level detected by the user device. The score indicates a proximity of the resource provider device and the user device. The server computer transmits the transaction data and the score to an authorization computer. Based on the transaction data and the score, the transaction is processed or terminated. These techniques provide assurance that the devices are in proximity to one another, which can be used to prevent fraudulent transactions.

Prior to discussing various embodiments of the invention, an explanation of various terms are provided below.

A "user" may refer to an entity such as a person, an organization, or a device or system associated with or operated by the person or organization that utilizes a resource for some purpose. A user may have one or more accounts that can be used to access the resource. A user may also be referred to as an account holder, a consumer, a subscriber, or a cardholder, etc., according to some embodiments.

A "user device" may be any suitable device that may be operated by a user. User devices may include cellular phones, personal digital assistants (PDAs), pagers, tablets, personal computers, and the like. As additional examples, user devices may include wearable devices (e.g., watches, rings, etc.). A user device may comprise any suitable hardware and software for performing such functions, and may include multiple devices or components.

A "resource" may refer to a service, an item, a location, data, information, or something of value that assists a user with achieving some purpose. Some resources may be restricted, and may require a user to have an account to access the resource. Examples of resources may include software applications and related functions; online services including cloud services; goods (virtual and/or physical objects) or services related to transactions; credits, points, and/or currencies that can be exchanged for other resources; electronic devices such as servers, computers, mobile devices, gaming systems, etc.; transportation such as vehicles or transit services, communications capabilities such as wireless services; restricted areas; media content; etc.

A "resource provider" may refer to an entity that can provide resources. Examples of resource providers may include service providers such as web service providers, social networks, issuers, banks, merchants, governmental agencies, transaction processing networks, etc.

A "resource provider device" may refer to a suitable device for communicating with a resource provider. In some embodiments, a resource provider device can be a web server, a merchant computer, or a transaction processing network that can interact with a user communication device. A resource provider device may generally be located in any suitable location, such as at the location of the service provider or a merchant, or can be at a remote location (e.g., in the cloud). Some examples of resource provider devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, websites, and the like. A resource provider device may use any suitable contact or contactless mode of operation to send or receive data with a communication device. In some embodiments, a resource provider device may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a communication device.

An "authorization entity" may typically refer to a business entity (e.g., a bank) that maintains an account (e.g., a financial account) for a user. The account can be enrolled in an application installed on a user device of the user to allow the user to conduct transactions on the account via the communication device. An authorization entity may be associated with one or more "authorization computers."

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may be associated with one or more "transport computers."

A "processing system" may include a network of one or more devices that can process and route transaction request messages. An example of a processing system may include data processing subsystems, networks, and operations used to support and deliver authorization services, exception file services, transaction scoring services, and clearing and settlement services. An example of a processing system is VisaNet™. Transaction processing systems such as VisaNet™ are able to process credit card transactions, debit card transactions, and other types of commercial transactions. VisaNet™, in particular, may include a VIP system (Visa Integrated Payments system) which processes authorization requests and a Base Il system which performs clearing and settlement services. A processing system may operate one or more "processor server computers."

A "transaction" can be a reciprocal exchange or interaction. In some embodiments, a transaction can include a payment transaction in which two devices can interact to facilitate a payment. A transaction may involve the exchange of monetary funds, or the exchange of goods or services for monetary funds between two individuals or entities.

The term "message" may include any data or information that may be transported from one entity to another entity (e.g., one computing device to another computing device). Messages may be communicated internally between devices/components within a computer or computing system or externally between devices over a communications network. Additionally, messages may be modified, altered, or otherwise changed to comprise encrypted or anonymized information.

An "authorization request message" may refer to an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also include transaction information, such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may refer to a message that responds to an authorization request. In some cases, it may be an electronic message reply to an authorization request message generated by an issuing financial institution or a transaction processing computer. The authorization response message may include, by way of example only, one or more of the following status indicators: Approval-transaction was approved; Decline-transaction was not approved; or Call Center-response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization.

"Authentication" or "authenticating" may refer to the process of proving or verifying certain information, and/or verifying the identity of the source of that information. For example, a user may provide authentication data (e.g., a credential) that is unique or only known to the user to prove the identity of the user. Examples of different types of authentication data may include biometrics, password, passcode, PIN, answers to security question(s), cryptographic response to challenge, human and/or device signature, etc.

An "account identifier" may include an original account identifier associated with a payment account. For example, an account identifier may be a primary account number (PAN) issued by an issuer for a card account (e.g., credit card, debit card, etc.). For instance, in some embodiments, an account identifier may include a sixteen digit numerical value such as "4147 0900 0000 1234." The first six digits of the account identifier (e.g., "414709") may represent an authorization entity identifier (BIN) that may identify an issuer associated with the account identifier.

A "processor" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

FIG. 1 illustrates a system 100 for validating transactions based on device proximity, according to some embodiments. System 100 may include a user device 102, resource provider device 104, transport computer 106, processor server computer 110, and authorization computer 112. For simplicity of illustration, a limited number of components are shown in FIG. 1. It is understood, however, that embodiments may include more than one of each component.

The components in the system depicted in FIG. 1 can be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), and/or the like.

In some embodiments, the user device 102 is a device operable by a user and capable of executing applications. As examples, the user device 102 may be a smartphone, a computer, a tablet, or the like. The user device 102 may be configured to receive and manage requests for information. The user device 102 may include hardware and/or software configured to store data. The user device 102 may include hardware and/or software configured to transmit data. The user device 102 may also be connected to one or more devices including the processor server computer 110 via a communication network. The user device 102 may also include hardware and/or software capable of receiving user input. The user device 102 may also include a keyboard, touchscreen, microphone, and/or the like for receiving data from a user. An example user device 400 is described in further detail below with respect to FIG. 4.

The resource provider device 104 may be associated with a resource providing entity such as a merchant, service provider, or a secure location. The resource provider device 104 may receive, transmit, and analyze messages such as authorization request messages, authorization response messages, and the like. The resource provider device 104 may generate settlement requests to request funds for resources provided. The resource provider device 104 may be connected to the transport computer 106. An example resource provider device 300 is described in further detail below with respect to FIG. 3.

The transport computer 106 may be associated with the resource provider device 104, and may manage requests (e.g., authorization requests) on behalf of the resource provider device 104. In some embodiments, the transport computer 106 may be operated by an acquirer.

The processor server computer 110 may include functionality to process transactions. In some embodiments, the processor server computer 110 is configured to evaluate a proximity between devices based on received signals, as described herein. An example of a processor server computer 200 is described below with respect to FIG. 2.

The authorization computer 112 may be a system associated with an issuer or entity (e.g., a bank) that has a business relationship with a processor server computer 108 or other entity. In some embodiments, the authorization computer 112 is configured to send and receive transaction related messages, as well as identify whether a particular transaction should be authorized.

Figure 2:
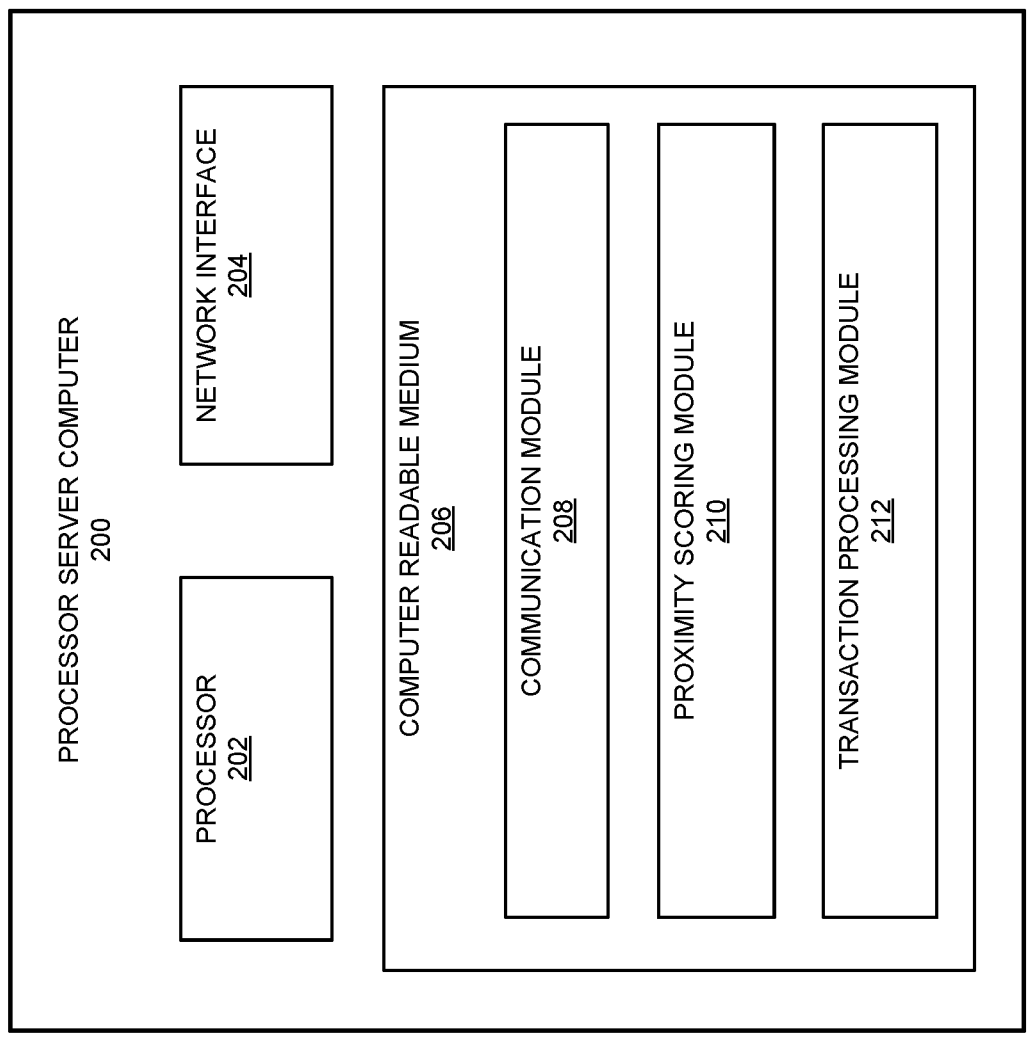
FIG. 2 illustrates a block diagram of a processor server computer, according to some embodiments.

FIG. 2 illustrates a block diagram of a processor server computer 200, according to some embodiments. Processor server computer 200 may include a processor 202, a network interface 204, and a computer readable medium 206 storing code executable by processor 202. Computer readable medium 206 may include a communication module 208, a proximity scoring module 210, and a transaction processing module 212. One or more these software modules may include code executable by processor 202 to perform functionalities including receiving, from a resource provider device, transaction data for a transaction, a first set of wireless communication signals available to the resource provider device, a second set of wireless communication signals available to the resource provider device, and a sound level detected by the resource provider device; retrieving, from a user device, a first set of wireless communication signals available to the user device, a second set of wireless communication signals available to the user device, and a sound level detected by the user device; computing a score based on the first set of wireless communication signals available to the resource provider device, the second set of wireless communication signals available to the resource provider device, the sound level detected by the resource provider device, the first set of wireless communication signals available to the user device, the second set of wireless communication signals available to the user device, and the sound level detected by the user device, wherein the score indicates a proximity of the resource provider device and the user device; and transmitting, to an authorization computer, the transaction data and the score, thereby causing the transaction to be processed or terminated based on the transaction data and the score.

Communication module 208 may comprise code that causes the processor 202 to generate messages, forward messages, reformat messages, and/or otherwise communicate with other entities. For example, the communication module may, in cooperation with processor 202, transmit and receive messages requesting or specifying proximity signals, authorization request messages, and authorization response messages.

Proximity scoring module 210 may comprise code that causes the processor 202 to generate proximity scores. Proximity scoring module 210 may include functionality to compute values and scores based on proximity signals such as wireless signals and sound levels, as described herein.

Transaction processing module 212 may comprise code that causes the processor 202 to perform transaction processing functions such as identifying appropriate computers for routing messages. Transaction processing module 212 may comprise code that causes the processor 202 to perform transaction processing functions such as modifying messages to include proximity score information.

Figure 3:
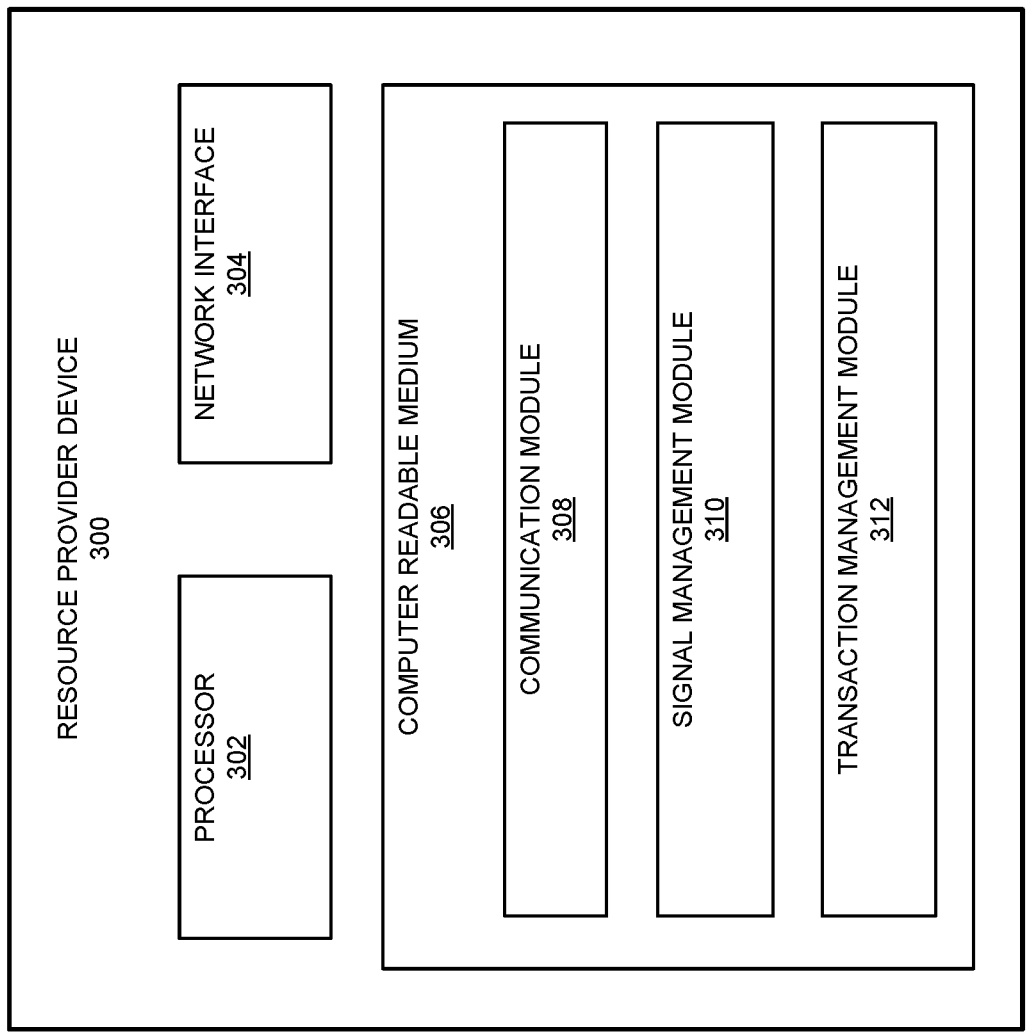
FIG. 3 illustrates a block diagram of a resource provider device, according to some embodiments.

FIG. 3 illustrates a block diagram of a resource provider device 300, according to some embodiments. Resource provider device 300 may include a processor 302, a network interface 304, and a computer readable medium 306 storing code executable by processor 302. Computer readable medium 306 may include a communication module 308, a signal management module 310, a transaction management module 312, and/or other suitable software modules. One or more these software modules may include code executable by processor 302 to perform functionalities including transmitting, to a server computer, transaction data for a transaction, a first set of wireless communication signals available to the resource provider device, a second set of wireless communication signals available to the resource provider device, and a sound level detected by the resource provider device, thereby causing the server computer to: compute a value based on the first set of wireless communication signals available to the resource provider device, the second set of wireless communication signals available to the resource provider device, the sound level detected by the resource provider device, a first set of wireless communication signals available to a user device, a second set of wireless communication signals available to the user device, and a sound level detected by the user device, wherein the value indicates a proximity of the resource provider device and the user device, and transmit, to an authorization computer, the transaction data and the value, thereby causing the transaction to be processed or terminated based on the transaction data and the value; and receiving a response message indicating whether the transaction is approved or declined.

The processor 302, network interface 304, computer readable medium 306, and communication module 308 of resource provider device 300 are similar to those of processor server computer 200 described above, and thus a detailed description of which need not be repeated.

Signal management module 310 may comprise code that causes the processor 302 to gather and prepare proximity signals. Signal management module 310 may include functionality to identify detected wireless communication signals, which may include short-range communication signals such as Bluetooth signals as well as other types of wireless communication signals such as Wi-Fi signals. Signal management module 310 may further include functionality to process the signals, which may include calculating derivatives of the signals such as Fourier transforms of noise signature data, feature vectors of available wireless signals, and the like, as described herein.

Transaction management module 312 may comprise code that causes the processor 302 to perform transaction management operations, such as identifying whether a transaction is approved or declined and displaying an indication thereof to a user. Transaction management module 311 may further comprise code that causes the processor 301 to gather transaction data from a user device and/or payment instrument.

Figure 4:
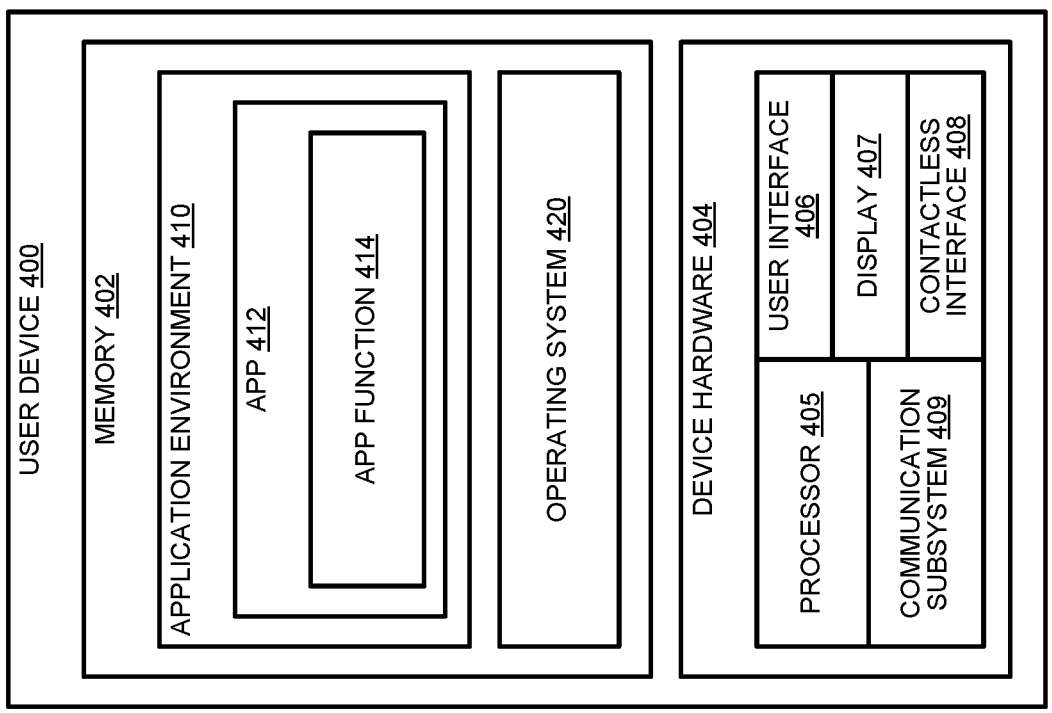
FIG. 4 illustrates a block diagram of a user device, according to some embodiments.

FIG. 4 illustrates a block diagram of a user device 400, according to some embodiments. User device 400 may include device hardware 404 coupled to a memory 402. Device hardware 404 may include a processor 405, a communication subsystem 409, user interface 406, a display screen 407 (which may be part of user interface 406), and a contactless interface 408. Processor 405 can be implemented as one or more integrated circuits (e.g., one or more single core or multicore microprocessors and/or microcontrollers), and is used to control the operation of user device 400. Processor 405 can execute a variety of programs in response to program code or computer-readable code stored in memory 402, and can maintain multiple concurrently executing programs or processes. Communications subsystem 409 may include one or more RF transceivers and/or connectors that can be used by user device 400 to communicate with other devices and/or to connect with external networks. User interface 406 can include any combination of input and output elements to allow a user to interact with and invoke the functionalities of user device 400. In some embodiments, display screen 407 may be part of user interface 406.

Contactless interface 408 may include one or more RF transceivers to interact with a contactless reader of an access device to conduct a transaction (e.g., payment transaction, access transaction, information exchange, etc.). In some embodiments, contactless interface 408 can be accessed by the operating system 420. In some embodiments, display 407 can also be part of contactless interface 408, and is used, for example, to perform transactions using Quick Response (QR) codes, bar codes, etc.

Memory 402 can be implemented using any combination of any number of non-volatile memories (e.g., flash memory) and volatile memories (e.g., DRAM, SRAM), or any other non-transitory storage medium, or a combination thereof media. Memory 402 may store operating system 420 and an applications environment 410 where one or more applications 412 implementing application functions 414 reside. Applications 412 may include a provider specific application used for accessing a resource from a resource provider, general purpose application such as a web browser, or other suitable applications. Examples of applications may include a wallet or banking application, payments application, merchant application, etc. In some embodiments, application functions may include gathering one or more sets of available wireless communication signals and noise levels and transmitting them to a server computer. Such an application may include functionality to display a user interface to prompt a user to give permission to provide such information.

Figure 5:
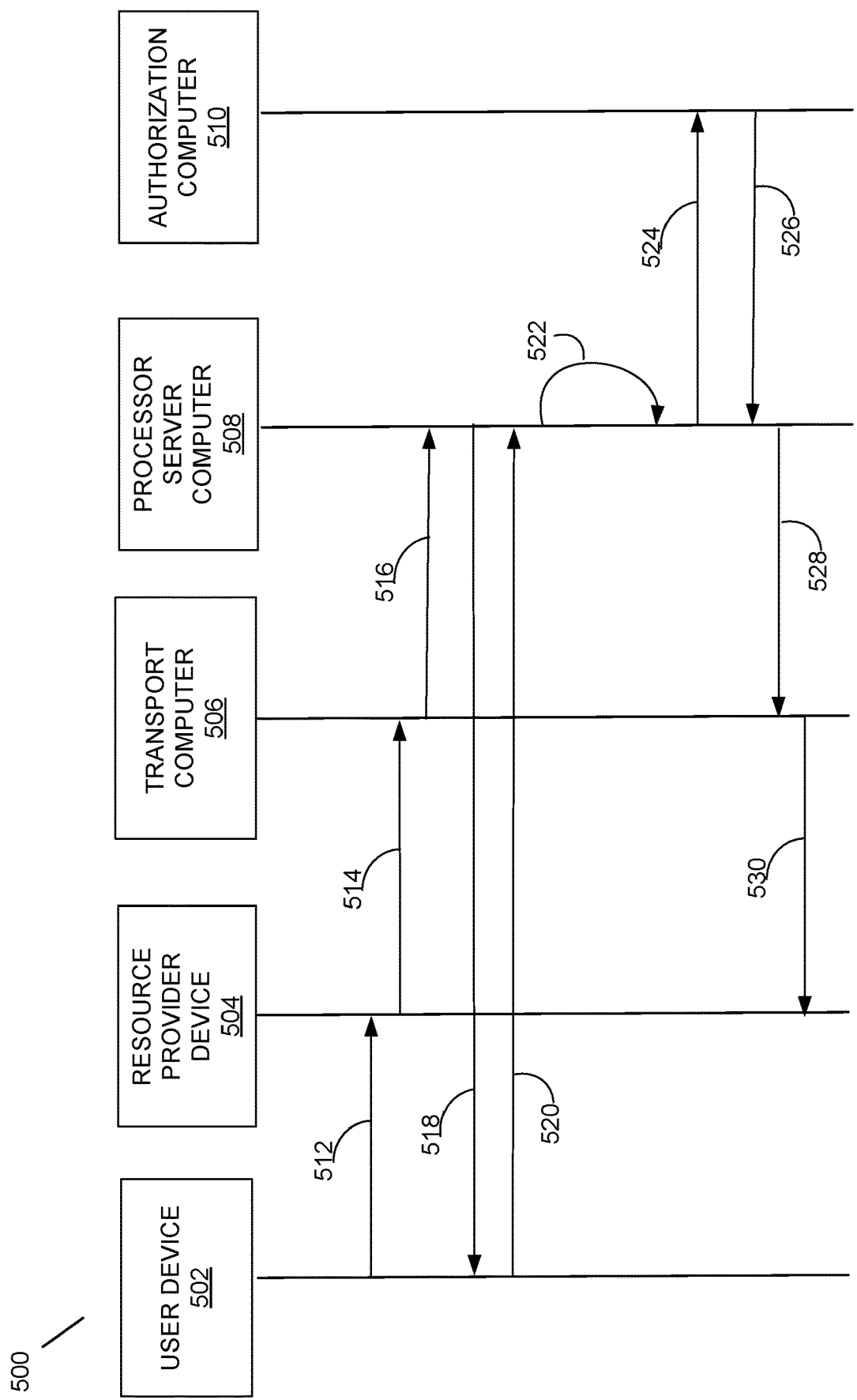
FIG. 5 illustrates a communications flow diagram of a method for validating transactions based on device proximity, according to some embodiments.

FIG. 5 illustrates a communications flow diagram of a method 500 for validating transactions based on device proximity, according to some embodiments. The method 500 may be performed by a user device 502, resource provider device 504, transport computer 506, processor server computer 508, and authorization computer 510, as described above with respect to FIGS. 1-4.

At step 512, the user device 502 initiates a transaction with the resource provider device 504. To initiate the transaction, the user device 502 may interact with the resource provider device 504 via near-field communication (e.g., a tap to pay transaction). The user device 502 transmits payment data to the resource provider device 504. The payment data may include an account identifier, expiration date, tokenized account identifier, PIN, and/or the like. In some instances, the user device 502 includes a payment application such as a mobile wallet and the user device 502 initiates the transaction via the payment application. Alternatively, or additionally, the transaction is initiated using a payment instrument such as a credit card, which interacts with the resource provider device via near-field communication to transmit the payment data. Alternatively, or additionally, the payment instrument interacts with the resource provider device via interaction with a chip or magnetic strip to transmit the payment data.

In some embodiments, upon receiving the transaction data from the user device 502 (or other payment instrument), the resource provider device 504 generates a transaction message (e.g., an authorization request message for the transaction). The transaction message may include transaction data, which may include a transaction amount as well as some or all of the payment data received from the user device 502 (e.g., account identifier, expiration date, PIN, CVC, and/or tokenized account identifier).

In some aspects, the resource provider device 504 further includes proximity information in the transaction message. In some aspects, the proximity information includes a first set of wireless communication signals available to the resource provider device. In some examples, the first set of wireless communication signals available to the resource provider device include short-range communication signals such as Bluetooth signals available to the resource provider device. The proximity information may include the surrounding Bluetooth devices and their signal strength. The resource provider device 504 may further include its own Bluetooth identifier with the proximity information. In some aspects, the proximity information further includes a second set of wireless communication signals available to the resource provider device. In some examples, the second set of wireless communication signals available to the resource provider device includes Wi-Fi signals. The proximity information may include a set of surrounding Wi-Fi identifiers and signal strengths. In some aspects, the proximity information further includes a sound level detected by the resource provider device. For example, the resource provider device detects an ambient sound level in units such as decibels. The proximity information may further include a noise signature, which describes the characteristics of the detected sound such as the sound levels of different frequencies.

At step 514, the resource provider device 504 transmits the transaction data and the proximity information to the transport computer 506. The transaction data may be transmitted in a transaction message such as an authorization request message as described above. Transmitting the transaction data to the transport computer may include transmitting the transaction data over a network. In some embodiments, the resource provider device 504 transmits the transaction data and the proximity information to the transport computer 506 in a single message. Alternatively, the resource provider device 504 transmits the transaction data and the proximity information to the transport computer 506 in separate transmissions. For example, the resource provider device 504 may transmit the transaction data to the transport computer 506, then receive a request for proximity information, then transmit the proximity information to the processor server computer 508 and/or the transport computer 506 responsive to the request.

At step 516, the transport computer 506 transmits the transaction data and the proximity information to the processor server computer 508. The transport computer 506 may forward the transaction data and/or proximity information received from the resource provider device 504 to the processor server computer. The processor server computer 508 receives the transaction data and proximity information from the transport computer 506 and/or the resource provider device 504.

At step 518, the processor server computer 508 transmits a request for proximity information to the user device 502. For example, the server computer 508 transmits, to the user device 502 over a network, a request for proximity information. The request for proximity information may be transmitted to an application on the user device 502.

At step 520, the user device 502 transmits the proximity information to the processor server computer 508. The user device 502 may transmit the proximity information to the processor server computer 508 responsive to receiving the request transmitted at step 518. In some examples, the user interacts with the user device to authorize transmission of the proximity information, causing the user device 502 to gather and transmit the proximity information. As described above, the proximity information can include one or more of a first set of wireless communication signals available to the user device, a second set of wireless communication signals available to the user device, and/or a sound level detected by the user device. In some instances, the proximity information is transmitted to the processor server computer 508 via a network transmission.

At step 522, the processor server computer 508 computes a score based on the first set of wireless communication signals available to the resource provider device, the second set of wireless communication signals available to the resource provider device, the sound level detected by the resource provider device, the first set of wireless communication signals available to the user device, the second set of wireless communication signals available to the user device, and the sound level detected by the user device. The score indicates a proximity of the resource provider device and the user device. For example, if the resource provider device and the user device are in the same room, the available wireless signals and sound level should be the same or very similar, whereas if the resource provider device and the user device are far apart, the available wireless signals and sound levels would be very different.

In some aspects, computing the score includes generating and comparing feature vectors for the set of signals collected by the resource provider device (e.g., a first feature vector) and the set of signals collected by the user device (e.g., a second feature vector). The server computer may generate the feature vectors. Alternatively, or additionally, the resource provider device and/or user device generates the feature vectors in whole or in part.

In some examples, a first feature vector is generated. The first feature vector includes a set of strength values for the first set of wireless communication signals available to the resource provider device and a value representing whether the strength of a first wireless communication signal of the user device is detected by the resource provider device at at least a threshold level. For example, each detected Bluetooth signal is assigned a strength value (e.g., on a scale of 1-100 or 1-10). The strength of the Bluetooth signal of the user device is compared to some threshold (e.g., 70, 80, 90, etc.). For example, if the Bluetooth signal of the user device is detected at a strength above the determined threshold, then the value is set to 100, otherwise the value is set to 0.

In some examples, a second feature vector is generated. The second feature vector includes a set of strength values for the set of short-range communication signals available to the user device and a value representing whether the strength of a short-range communication signal of the resource provider device is detected by the user device at at least a threshold level. The second feature vector may be computed in a similar fashion as described above with respect to the first feature vector, but using signal strengths as detected by the user device.

As a specific example, consider Bluetooth signals detected by devices D1 and D2. The strength of the Bluetooth signal detected for a given device is rated at a value between 0 and 100. Each device's own strength is rated at 100. It is strongly expected that the resource provider device detects some Bluetooth signal from the user device and vice versa. A dimension (BM (Mutual)) is included in the feature vectors to specifically indicate whether the devices detect each other's Bluetooth signals. In this example, the values for the feature vectors are:

TABLE 1

| Bluetooth ID | Strength on D1 | Strength on D2 |
|---|---|---|
| B1 (of device D1) | 100 (own) | 98 |
| B2 (of device D2) | 96 | 100 (own) |
| B3 | 50 | 50 |
| B4 | 10 | 0 |
| B5 | 65 | 85 |

TABLE 1-continued

| Bluetooth ID | Strength on D1 | Strength on D2 |
| --- | --- | --- |
| BM (Mutual) | 100 if B2 signal is present in B1 with at least 80% strength | 100 if B1 signal is present in B2 with at least 80% strength |

Without weights, the values in Table 1 are used to generate the feature vectors:

$$FV(\text{Bluetooth } D1) = (100B1, 96B2, 50B3, 10B4, 65B5, 100BU)$$

$$FV(\text{Bluetooth } D2) = (98B1, 100B2, 50B3, 0B4, 85B5, 100BU)$$

The score is computed based on the first feature vector and the second feature vector. For example, the server computer compares first feature vector and the second feature vector using a suitable similarity algorithm. (See, e.g., Kunal Gohrani, "Different Types of Distance Metrics used in Machine Learning," Medium, https://medium.com/@kunal_gohrani/different-types-of-distance-metrics-used-in-machine-learning-e9928c5e26c7, 2019). In some examples, the first feature vector and the second feature vector are compared using Euclidean distance. Euclidean distance is a measure of the straight-line distance between two points in a multidimensional space. Euclidean distance is sensitive to the values of dimensions and their scales. This means that if the values of dimensions are not normalized, dimensions with larger values will have a greater impact on the similarity score than dimensions with smaller values. Alternatively, or additionally, the server computer computes the score using the Pearson correlation coefficient. This measure calculates the correlation between two vectors based on their values. It measures how well two vectors are linearly related, and ranges from −1 (perfect negative correlation) to +1 (perfect positive correlation).

Alternatively, or additionally, the server computer computes the score using the Jaccard similarity coefficient. This measure is commonly used for binary data, such as sets. It measures the size of the intersection of two sets divided by the size of the union of the sets. Alternatively, or additionally, the server computer computes the score using Manhattan distance. This measure calculates the distance between two points in a multidimensional space by summing the absolute differences of their corresponding coordinates.

Alternatively, or additionally, the server computer computes the score using Minkowski distance. This is a generalization of Euclidean distance that allows for different levels of sensitivity to the values of dimensions. The parameter "p" in the formula determines the level of sensitivity, with p=1 corresponding to Manhattan distance and p=2 corresponding to Euclidean distance. Alternatively, or additionally, the server computer computes the score using cosine distance. This is a variation of cosine similarity that calculates the distance between two vectors based on their angles. It is the complement of the cosine similarity and is defined as 1-cosine similarity.

In some aspects, additional feature vectors are computed and compared. For example, the server computer (and/or resource provider computer and/or user device) generates a first feature vector representing the first set of wireless communication signals available to the resource provider device and generates a second feature vector representing the first set of wireless communication signals available to the user device, as described above. A third feature vector is generated representing the second set of wireless communication signals available to the resource provider device. A fourth feature vector is generated representing the second set of wireless communication signals available to the user device. The third and fourth feature vectors may represent the strengths of Wi-Fi signals detected by the resource provider device and the user device, respectively. In some aspects, the third and fourth feature vectors further include a value representing whether the strength of the second wireless communication signal of the user device is detected by the resource provider device at at least a threshold level. This may be computed in a similar fashion as described above with respect to the strength of the first wireless communication signal of the user device.

In some aspects, multiple values are computed based on the feature vectors. For example, the server computer computes a first value based on the first feature vector and the second feature vector. As a specific example, the server computer uses a suitable similarity algorithm as described above to compare the Bluetooth signals detected by the resource provider device to the Bluetooth signals detected by the user device. The server computer may further compute a second value based on the third feature vector and the fourth feature vector. For example, the server computer uses a suitable similarity algorithm as described above to compare the Wi-Fi signals detected by the resource provider device to the Wi-Fi signals detected by the user device. The server computer may further compute a third value based on the sound level detected by the resource provider device and the sound level detected by the user device. For example, the sound detected by the resource provider device (e.g., in decibels) is compared to the sound detected by the user device. Alternatively, or additionally, the sound signature is converted to a Fourier transform for each of the resource provider device and the user device, and the Fourier transforms are compared. Alternatively, or additionally, the amplitude distributions or amplitude distributions of frequencies are computed and compared for the sound detected by each of the resource provider device and the user device.

In some aspects, weights are assigned to the computed multiple values. For example, respective weights are assigned to the first value, the second value, and the third value. As a specific example, Bluetooth signals are assigned a weight of 40, Wi-Fi signals are assigned a weight of 30, and sound levels are assigned a weight of 30. Depending on the environment, the server computer may assign different weights for the first value, the second value, and the third value. For example, the server computer identifies an environment of the resource provider device and assigns the respective weights based on the environment. As a specific example, Bluetooth is a stronger indication of proximity in many environments, in which case scores corresponding to Bluetooth or other short-range communication signals are weighted more heavily. In outdoor settings, sound may be weighted more heavily. In some examples, a model is used to determine the right weights for different signal types, based on a history of the resource provider device. As a specific example, the server computer assigns a model to the resource provider device, correlated with a resource provider identifier. For environments where many people gather such as restaurants, Bluetooth may be weighted more heavily, as more mobile devices with Bluetooth may be present. For a street vendor, sound may be weighted more heavily due to the large amount of ambient noise. In an office setup where footfalls are less but Wi-Fi signals are predominant, Wi-Fi may be weighted more heavily. The overall score may be the weighted sum of the individual values (e.g., a first weight times the first value plus a second weight times the second value plus a third weight times the third value). The result is a score indicating the certainty of the two devices being nearby. For lower scores, the transaction can be considered riskier.

At step 524, the processor server computer 508 transmits the transaction data and the score to the authorization computer 510. The authorization computer analyzes the score to determine whether the devices are in proximity. This may be combined with other factors to determine whether the transaction should be processed or terminated. In some examples, the authorization computer compares the received score to one or more threshold scores. For example, a threshold is defined which pushes the transaction for advanced authentication, such as requiring the user to enter a PIN. Alternatively, or additionally, if the score is below a certain threshold, the transaction is declined. In some aspects, transmitting the transaction data and the value causes the transaction to be processed or terminated based on the transaction data and the value. Causing the transaction to be processed may include causing the authorization computer to determine that the transaction should be approved (e.g., based on the score exceeding a threshold). In alternative instances, causing the transaction to be terminated may include causing the authorization computer to decline the transaction or otherwise refrain from further processing the transaction (e.g., based on the score being below a threshold). Causing the transaction to be processed may further include causing the authorization computer to transmit an authorization response message, which may result in the other computers forwarding the authorization response message, as described below, as well as clearing and settlement.

The authorization server computer further processes the transaction data. The determination whether to process or terminate the transaction may further be based on the transaction data. The sending of the authorization request message to the authorization computer may cause the authorization computer to perform authorization operations. For example, the authorization computer may receive a PAN and a transaction amount, use the PAN to identify an account, and determine whether sufficient funds are available in the account to cover the transaction amount. In some aspects, the transaction amount may be limited based on the score. For example, if the score is above a first threshold but below a second threshold, transactions may be limited to some dollar amount such as $50 or $20.

In some embodiments, when the transaction is processed, the transport computer, the processor server computer, the authorization computer, and any other suitable device(s) can perform a clearing and settlement process at any suitable time, for example, at the end of a day.

At step 526, the authorization computer 510 transmits an authorization response message to the processor server computer 508. The authorization response message indicates whether the transaction is approved or declined. The authorization computer may transmit the authorization response message to the processor server computer over a network.

At step 528, the processor server computer 508 transmits the authorization response message to the transport computer 506. The processor server computer may transmit the authorization response message to the transport computer over a network.

At step 530, the transport computer 506 transmits the authorization response message to the resource provider device 504. The transport computer may transmit the authorization response message to the resource provider device over a network.

The resource provider device may determine, based on the authorization response message, whether the transaction is approved or declined. The resource provider device may display, to the user, an indication of whether the transaction is approved or declined (e.g., the text "approved" or "declined" is displayed on a display component of the resource provider device). Alternatively, or additionally, the resource provider device may initiate a particular level of step-up authentication based on the authorization response message. For example, the authorization response message includes the computed score. If the score is above a first threshold, but below a second threshold, the resource provider device may prompt the user to enter a PIN.

Embodiments of the invention provide for a number of technical advantages. For example, embodiments of the invention provide for improved computer security by providing accurate techniques for validating device proximity. It has been found that basing a comparison on the combination of short-range wireless communication signals, Wi-Fi signals, and sound levels provides an accurate indication of device proximity. Using these techniques, computing systems are better able to determine a likelihood that a user is the one initiating a payment transaction and prevent fraud.

The techniques described herein can improve the security of transaction processing in various contexts. For example, if a card is stolen or spoofed and used for tap to pay, by determining whether the user device is deployed at the same location (which is highly indicative of whether the user is at the same location), the system can identify that fraudulent use is likely. The proximity scores can alternatively or additionally be used in dispute resolution to confirm or deny that the user device was present at the time of the transaction. The techniques described herein can also be used as reliable way to increase tap to pay limits. In many locations, tap to pay transaction limits are static, but to improve user convenience, a risk-based secondary threshold can be implemented to increase the threshold for transactions deemed less risky based on device proximity.

A computer system will now be described that may be used to implement any of the entities or components described herein. Subsystems in the computer system are interconnected via a system bus. Additional subsystems include a printer, a keyboard, a fixed disk, and a monitor which can be coupled to a display adapter. Peripherals and input/output (I/O) devices, which can couple to an I/O controller, can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer-readable medium.

The techniques described herein may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

The methods and processes described herein are exemplary in nature, and the methods and processes in accordance with some embodiments may perform one or more of the steps in a different order than those described herein, include one or more additional steps not specially described, omit one or more steps, combine one or more steps into a single step, split up one or more steps into multiple steps, and/or any combination thereof.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a," "an," or "the" is intended to mean "one or more" unless specifically indicated to the contrary.

What is claimed is:

1. A computer-implemented method comprising:
   receiving, by a server computer from a resource provider device, transaction data for a transaction, a first set of wireless communication signals available to the resource provider device, a second set of wireless communication signals available to the resource provider device, and a sound level detected by the resource provider device;
   retrieving, by the server computer from a user device, a first set of wireless communication signals available to the user device, a second set of wireless communication signals available to the user device, and a sound level detected by the user device;
   computing, by the server computer, a score based on the first set of wireless communication signals available to the resource provider device, the second set of wireless communication signals available to the resource provider device, the sound level detected by the resource provider device, the first set of wireless communication signals available to the user device, the second set of wireless communication signals available to the user device, and the sound level detected by the user device, wherein the score indicates a proximity of the resource provider device and the user device; and
   transmitting, by the server computer to an authorization computer, the transaction data and the score, thereby causing the transaction to be processed or terminated based on the transaction data and the score.

2. The computer-implemented method of claim 1, wherein computing the score comprises:
   generating a first feature vector, the first feature vector comprising a set of strength values for the first set of wireless communication signals available to the resource provider device and a value representing whether the strength of a first wireless communication signal of the user device is detected by the resource provider device at at least a threshold level;
   generating a second feature vector, the second feature vector comprising a set of strength values for the first set of wireless communication signals available to the user device and a value representing whether the strength of a first communication signal of the resource provider device is detected by the user device at at least a threshold level; and
   computing the score based on the first feature vector and the second feature vector.

3. The computer-implemented method of claim 1, wherein computing the score comprises:
   generating a first feature vector representing the first set of wireless communication signals available to the resource provider device;
   generating a second feature vector representing the first set of wireless communication signals available to the user device;
   generating a third feature vector representing the second set of wireless communication signals available to the resource provider device;
   generating a fourth feature vector representing the second set of wireless communication signals available to the user device,
   computing a first value based on the first feature vector and the second feature vector;
   computing a second value based on the third feature vector and the fourth feature vector;
   computing a third value based on the sound level detected by the resource provider device and the sound level detected by the user device; and
   assigning respective weights to the first value, the second value, and the third value.

4. The computer-implemented method of claim 3, further comprising:
   identifying an environment of the resource provider device; and
   assigning the respective weights based on the environment.

5. The computer-implemented method of claim 1, wherein retrieving, by the server computer from the user device, the first set of wireless communication signals available to the user device, the second set of wireless communication signals available to the user device, and the sound level detected by the user device comprises:
   transmitting a request to an application on the user device; and
   responsive to the request, receiving the first set of wireless communication signals available to the user device, the second set of wireless communication signals available to the user device, and the sound level detected by the user device via a network communication from the application on the user device.

6. The computer-implemented method of claim 1, wherein:
   the first set of wireless communication signals comprise short-range communication signals and the second set of wireless communication signals comprise Wi-Fi signals.

7. The computer-implemented method of claim 6, wherein the short-range communication signals comprise Bluetooth signals.

8. The computer-implemented method of claim 1, wherein the score is computed based on a Euclidean distance, a Pearson correlation coefficient, a Jaccard similarity coefficient, a Manhattan distance, a Minkowski distance, or a cosine distance.

9. A server computer comprising:
   a processor; and
   a non-transitory computer-readable medium comprising code, executable by the processor, for implementing operations comprising:
   receiving, from a resource provider device, transaction data for a transaction, a first set of wireless communication signals available to the resource provider device, a second set of wireless communication signals available to the resource provider device, and a sound level detected by the resource provider device;
   retrieving, from a user device, a first set of wireless communication signals available to the user device, a second set of wireless communication signals available to the user device, and a sound level detected by the user device;
   computing a score based on the first set of wireless communication signals available to the resource provider device, the second set of wireless communication signals available to the resource provider device, the sound level detected by the resource provider device, the first set of wireless communication signals available to the user device, the second set of wireless communication signals available to the user device, and the sound level detected by the user device, wherein the score indicates a proximity of the resource provider device and the user device; and
   transmitting, to an authorization computer, the transaction data and the score, thereby causing the transaction to be processed or terminated based on the transaction data and the score.

10. The server computer of claim 9, wherein computing the score comprises:
    generating a first feature vector, the first feature vector comprising a set of strength values for the first set of wireless communication signals available to the resource provider device and a value representing whether the strength of a first wireless communication signal of the user device is detected by the resource provider device at at least a threshold level;
    generating a second feature vector, the second feature vector comprising a set of strength values for the first set of wireless communication signals available to the user 8 device and a value representing whether the strength of a first wireless communication signal of the resource provider device is detected by the user device at at least a threshold level; and
    computing the score based on the first feature vector and the second feature vector.

11. The server computer of claim 9, wherein computing the score comprises:
    generating a first feature vector representing the first set of wireless communication signals available to the resource provider device;
    generating a second feature vector representing the first set of wireless communication signals available to the user device;
    generating a third feature vector representing the second set of wireless communication signals available to the resource provider device;
    generating a fourth feature vector representing the second set of wireless communication signals available to the user device, computing a first value based on the first feature vector and the second feature vector;
    computing a second value based on the third feature vector and the fourth feature vector;
    computing a third value based on the sound level detected by the resource provider device and the sound level detected by the user device; and
    assigning respective weights to the first value, the second value, and the third value.

12. The server computer of claim 11, the operations further comprising:
    identifying an environment of the resource provider device; and
    assigning the respective weights based on the environment.

13. The server computer of claim 9, wherein retrieving, from the user device, the first set of wireless communication signals available to the user device, the second set of wireless communication signals available to the user device, and the sound level detected by the user device comprises:
    transmitting a request to an application on the user device; and
    responsive to the request, receiving the first set of wireless communication signals available to the user device, the second set of wireless communication signals available to the user device, and the sound level detected by the user device via a network communication from the application on the user device.

14. The server computer of claim 9, wherein:
    the first set of wireless communication signals comprise short-range communication signals and the second set of wireless communication signals comprise Wi-Fi signals.

15. The server computer of claim 14, wherein the short-range communication signals comprise Bluetooth signals.

16. A computer-implemented method comprising:
    transmitting, by a resource provider device to a server computer, transaction data for a transaction, a first set of wireless communication signals available to the resource provider device, a second set of wireless communication signals available to the resource provider device, and a sound level detected by the resource provider device, thereby causing the server computer to:
    compute a value based on the first set of wireless communication signals available to the resource provider device, the second set of wireless communication signals available to the resource provider device, the sound level detected by the resource provider device, a first set of wireless communication signals available to a user device, a second set of wireless communication signals available to the user device, and a sound level detected by the user device, wherein the value indicates a proximity of the resource provider device and the user device, and
    transmit, to an authorization computer, the transaction data and the value, thereby causing the transaction to be processed or terminated based on the transaction data and the value; and
    receiving, by the resource provider device, a response message indicating whether the transaction is approved or declined.

17. The computer-implemented method of claim 16, further comprising:
    receiving, by the resource provider device, the transaction data via near-field communication.

18. The computer-implemented method of claim 16, wherein the server computer further:
  retrieves, from the user device, the first set of wireless communication signals available to the user device, the second set of wireless communication signals available to the user device, and the sound level detected by the user device.

19. The computer-implemented method of claim 16, wherein:
  the first set of wireless communication signals comprise short-range communication signals and the second set of wireless communication signals comprise Wi-Fi signals.

20. The computer-implemented method of claim 19, wherein the short-range communication signals comprise Bluetooth signals.

\* \* \* \* \*

UNITED STATES PATENT AND TRADEMARK OFFICE
CERTIFICATE OF CORRECTION

| | |
|---|---|
| PATENT NO. | : 12,470,937 B2 |
| APPLICATION NO. | : 18/351148 |
| DATED | : November 11, 2025 |
| INVENTOR(S) | : Shakthidhar B G et al. |

Page 1 of 1

It is certified that error appears in the above-identified patent and that said Letters Patent is hereby corrected as shown below:

In the Claims

In Claim 10, Column 19, Line 48, delete "8".

Signed and Sealed this
Twenty-seventh Day of January, 2026

John A. Squires
*Director of the United States Patent and Trademark Office*